UNITED STATES PATENT OFFICE.

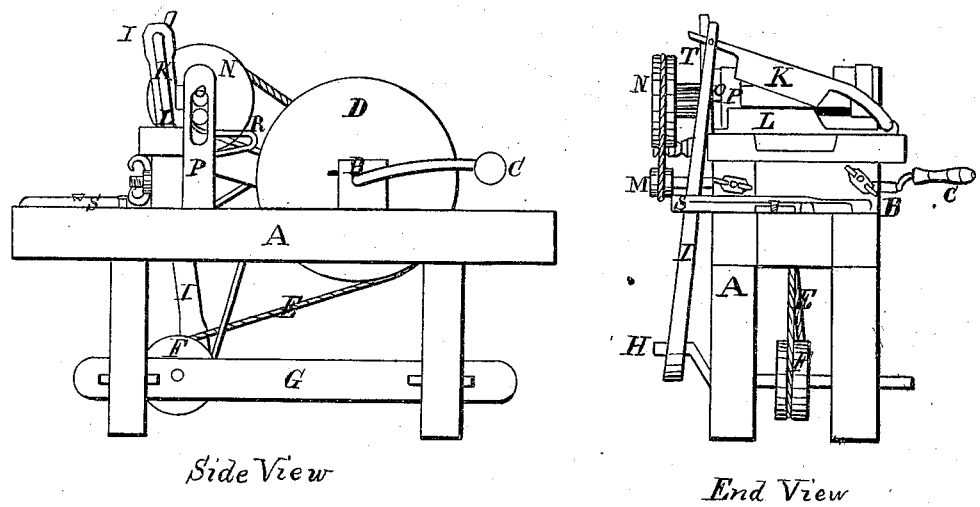

SAMUEL JOHNSON, OF WALNUT LANE, NORTH CAROLINA.

MACHINE FOR CUTTING FUR FROM SKINS.

Specification of Letters Patent No. 131, dated February 24, 1837.

*To all whom it may concern:*

Be it known that I, SAMUEL JOHNSON, of Walnut Lane, in the county of Surry and State of North Carolina, have invented a new and useful Improvement in Machines Used for Cutting Fur from Skins; and I do declare that the following is a full and exact description.

The machinery consists of a suitable frame A, across which lies a horizontal shaft B, turned by a crank C, by hand, and upon which is a large grooved pulley D, around which passes a band E leading to another pulley F on a shaft turning in a movable frame G, regulated and secured by keys for tightening the band when required. On this last mentioned shaft is another crank H, and from its wrist a pitman rod I, leads to the end of the knife K, which vibrates against a fixed plate or knife L, in the manner of a tinman's shears, for cutting the fur from the skins. On the first mentioned shaft is a small whirl M, around which passes a band leading to a grooved pulley N, on the end of one of the feeding rollers O, for operating them; these rollers have small pinions on their ends working into each other, and turn in slots in posts P, which may be raised or lowered at pleasure and regulated by thumb screws Q. Under the gudgeons of the lower roller are springs R, for bearing it up and receding it from the upper one so as to allow thicker or thinner skins to pass through. In front of the posts of the rollers is a spring S, fixed for the pitman to strike in order to press the movable shear toward the fixed one, and beside there is another spring T for bearing the movable shear from the fixed one. In front of the rollers is a board U, to prevent the skins rising with the movable shear, behind the shears is a box V, to receive the fur or hair, and in front is a receiver for the skins, in the front and rear of the shears is an inclined piece W, to guide the fur and skin. The skin is passed through between the rollers, and thence between the shears; motion being given causes the shears to operate like tinman's shears as before mentioned cutting the fur from the skin the former falling back into the box, while the latter is thrown forward by the motion of the upper shear.

What I claim as my invention and desire to secure by Letters Patent in the above described machine is—

The method of vibrating the upper shear on a pivot at one end, and regulating the same by the springs bearing against the pitman rod and the board U for preventing the skin from rising substantially as before described, in combination with each other and with the other parts of the machine substantially as above described.

SML. JOHNSON.

Witnesses:
N. D. HUNT,
BENJAMIN W. NAYLOR.